United States Patent [19]

Graber et al.

[11] Patent Number: 5,029,440
[45] Date of Patent: Jul. 9, 1991

[54] ACOUSTICAL ANTI-ICING SYSTEM

[75] Inventors: Daryl J. Graber, North Palm Beach; Gregory J. Mack, Palm Beach Gardens, both of Fla.

[73] Assignee: The United States of America as represented by the Secretary of the Air Force, Washington, D.C.

[21] Appl. No.: 471,164

[22] Filed: Jan. 26, 1990

[51] Int. Cl.⁵ .......................................... F02C 7/047
[52] U.S. Cl. ............................ 60/39.093; 244/134 B
[58] Field of Search ............... 60/39.093; 244/134 R, 244/134 B

[56] References Cited

U.S. PATENT DOCUMENTS

| 2,594,118 | 4/1952 | Boyd | 60/39.093 |
| 2,634,049 | 4/1953 | Hodges et al. | 230/132 |
| 2,680,345 | 6/1954 | Frost | 60/39.09 |
| 2,718,350 | 9/1955 | Burgess | 230/122 |
| 3,123,283 | 3/1964 | Leis | 60/39.093 |
| 3,341,114 | 9/1967 | Larson | 230/132 |
| 3,779,488 | 12/1973 | Levin | 244/134 A |
| 4,458,865 | 7/1984 | Sandorff | 244/134 R |

Primary Examiner—Louis J. Casaregola
Attorney, Agent, or Firm—Irwin P. Garfinckel; Donald J. Singer

[57] ABSTRACT

Hollow inlet guide vanes in the air intake of a gas turbine engine are supplied with pressurized bleed air. The interior of the vanes are provided with orifices through which the bleed air must flow, and those orifices are tuned to a desired frequency which sets up vane vibrations. This arrangement provides deicing by both the supply of heated bleed air which impinges on the selected areas of the vanes and by the vibrations which are set up in the vanes, and it does so simply with the use of the bleed air.

5 Claims, 2 Drawing Sheets

ACOUSTICAL ANTI-ICING SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates to aviation power plants and to the means for preventing the icing of surfaces in the air intake opening of an aircraft engine.

Various more or less effective means for minimizing the accumulation of ice on exposed intake surfaces of aviation power plant are known. Deicing apparatus is particularly desirable for protection of the air intake opening of a gas turbine engine of the type comprising a turbine driven compressor, which is operable to draw large volumes of air from the atmosphere through the forward directed intake opening for delivery under pressure to the fuel combustion apparatus of the engine.

A conventional gas turbine engine comprises a streamlined cylindrical outer casing which may be mounted in or on the fuselage of an aircraft, and which is mounted to present minimal frontal area and drag during operation of the plane at high speed. Supported within the outer casing is an inner casing which forms an annular passageway through the engine from a forward directed air intake to a rearward directed exhaust. Air entering the intake opening is compressed and delivered to a combustion chamber. Hot gases issuing from the combustion chamber are then expanded through the turbine and discharged through the exhaust as a jet to provide propulsive thrust or to drive a fan.

In order to insure proper distribution of intake air flowing to the compressor and to turn the air to the proper angle so that the air strikes the compressor vanes at the proper angle, a plurality of inlet guide vanes are used. During the operation of the engine large quantities of air are drawn through the air intake and past the guide vanes, with the result that deposits of ice tend to accumulate on the exposed surfaces.

The prior art discloses many anti-icing systems for preventing the accumulation of ice on the inlet guide vanes. A simple and practical deicing or anti-icing system for an aircraft gas turbine engine uses hot gases piped from a point aft of the compressor to a manifold surrounding the guide vanes or other elements exposed to the air intake. For example, Burgess U.S. Pat. No. 2,718,350 discloses a system which deices by bleeding compressor air and supplying it to the interior of hollow inlet guide vanes. In other systems such as Frost U.S. Pat. No. 2,680,345 a special combustion system is used to supply hot gases to the interior of the vanes. In Larson U.S. Pat. No. 3,341,114 hot gases applied to the interior of the guide vanes cause internal corrugations to flex and therefore aid in the breaking up of ice forming on the surfaces of the inlet guide vanes. In Hodges et al U.S. Pat. No. 2,634,049, the gas turbine exhaust gases are used to heat various forms of inlet guide vanes.

The prior art also teaches deicing by inducing sonic or ultrasonic vibrations within the inlet guide vane. As pointed out in Levin U.S. Pat. No. 3,779,488 a number of deicing systems functioned by building up ultrasonic or audio frequency oscillations on the surface of the vane. These oscillations were induced by generating electrical oscillations and converting those oscillations to mechanical vibrations. Levin claimed to have improved the prior art systems by making a more efficient oscillator.

SUMMARY OF THE INVENTION

In accordance with this invention, hollow inlet guide vanes in the air intake of a gas turbine engine are supplied with pressurized bleed air. The interior of the vanes are provided with orifices through which the bleed air must flow, and those orifices are tuned to a desired frequency which sets up vane vibrations. This arrangement thereby provides anti-icing and deicing by both the supply of hot bleed air which impinges on the selected areas of the vanes and by the vibrations which are set up in the vanes, and it does so simply with the use of the bleed air.

The purpose of this invention is to prevent the accumulation of ice on the inlet guide vanes of a gas turbine engine, and it does so by passing bleed air from the compressor through the vanes not only to heat the exposed surfaces, but also to cause sonic or ultrasonic vibrations in the vanes to thereby break up ice formations. Thus, the present invention combines two known methods of deicing, namely flowing the bleed gases from the compressor, or from a position aft of the compressor, and using those bleed gases to impinge on selected surfaces of the vane, and to generate sonic or ultrasonic vibrations within the vane because of the flow of air through the tuned orifices.

DESCRIPTION OF THE PREFERRED EMBODIMENTS

Figures 1, 2:
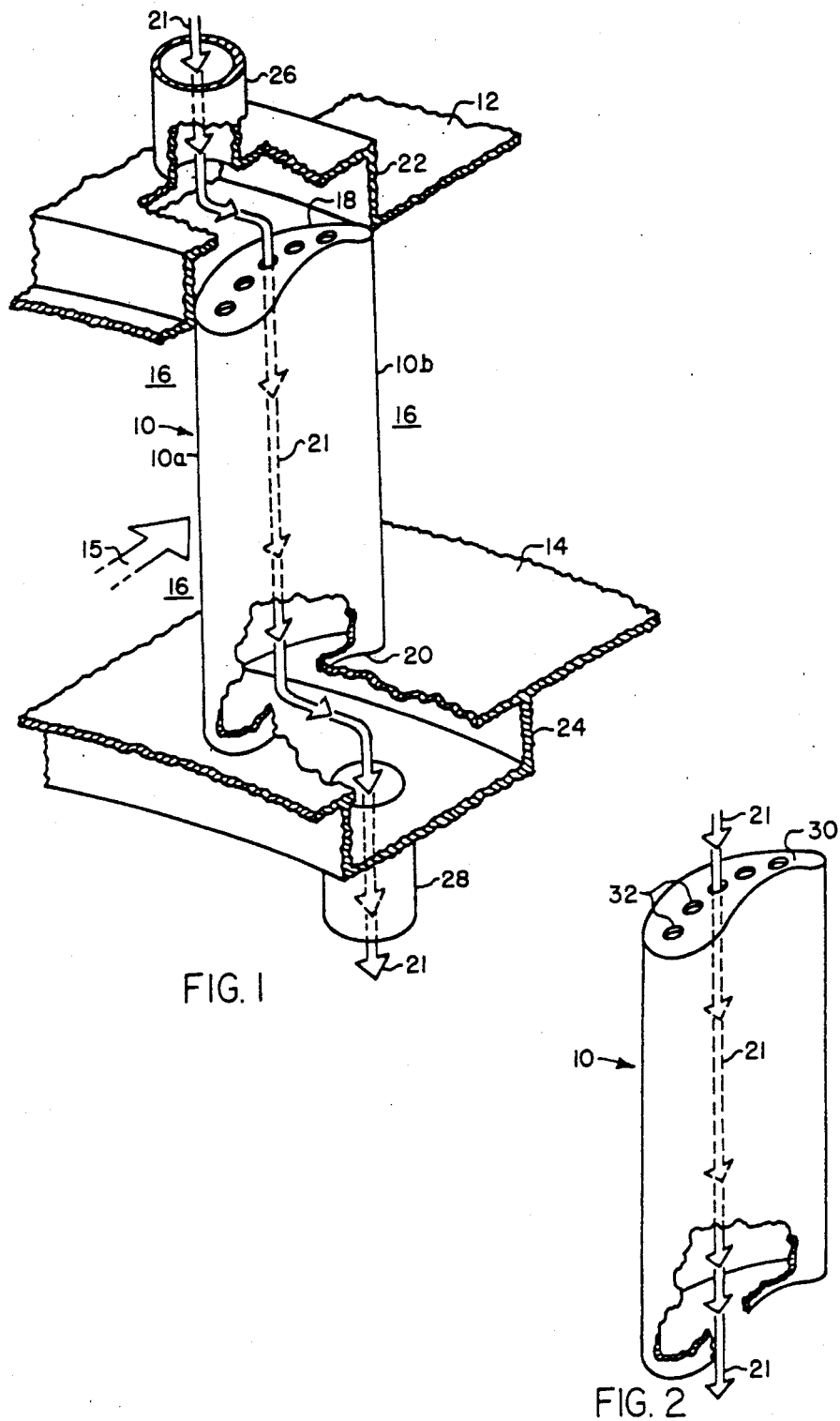
FIG. 1 is a schematic representation of the intake of a gas turbine engine.
FIG. 2 is a schematic of the inlet guide vane used in the embodiment of FIG. 1.

FIG. 1 is a fragmentary view of the air inlet portion of a gas turbine engine having a plurality of hollow inlet guide vanes 10 (only one of which is shown) radially mounted in an annulus comprised of an outer cylindrical casing 12 and an inner cylindrical casing 14. The vanes 10 have a leading edge 10a and a trailing edge 10b. Inlet air (indicated by the arrow 15) to the gas turbine engine travels axially past the leading edges 10a of the vanes 10 through the annular space 16 between the casings 12 and 14 into the engine compressor (not shown). The outer casing 12 is provided with a slot 18 at the outer tip of each of the guide vanes 10 while the inner casing 14 is provided with a slot 20 at the inner tip of each guide vane. A manifold 22 surrounds the outer casing 12, while a manifold 24 surrounds the inner casing 14. An inlet pipe 26 connected between the manifold 22 and the compressor (not illustrated) connects compressor bleed air 21 to the manifold 22. The bleed air passes through the manifold 22 into the end of each hollow inlet guide vane 10, through the vane, from which its exits into the manifold 24 and the outlet pipe 28.

The details of the construction of the inlet guide vanes shown in the embodiment of FIG. 1 are more clearly shown in FIG. 2 where the inlet guide vane 10 is shown as a hollow air foil shaped to register with the slots 18 and 20 into which they are mounted and secured in a conventional manner. The radial outer end of each vane 10 is closed by a thin wall 30 which is provided with a plurality of orifices 32. The radial inner end of the vane is open so that bleed air 21 entering the vane through the orifices 32 is free to exit. The orifices 32 are tuned to a desired sonic or ultrasonic frequency selected to provide sonic or ultrasonic vibrations, so that when bleed air is supplied to the vanes from the manifold it will cause each vane to vibrate. As taught by Levin in U.S. Pat. No. 3,779,488, these vibrations will aid in breaking up or preventing ice accumulations on the vanes. Thus, deicing is accomplished by the combination of heated air impinging on the interior surface of the vanes and by the vibrations generated because of the air flowing through the tuned orifices.

Figure 3:
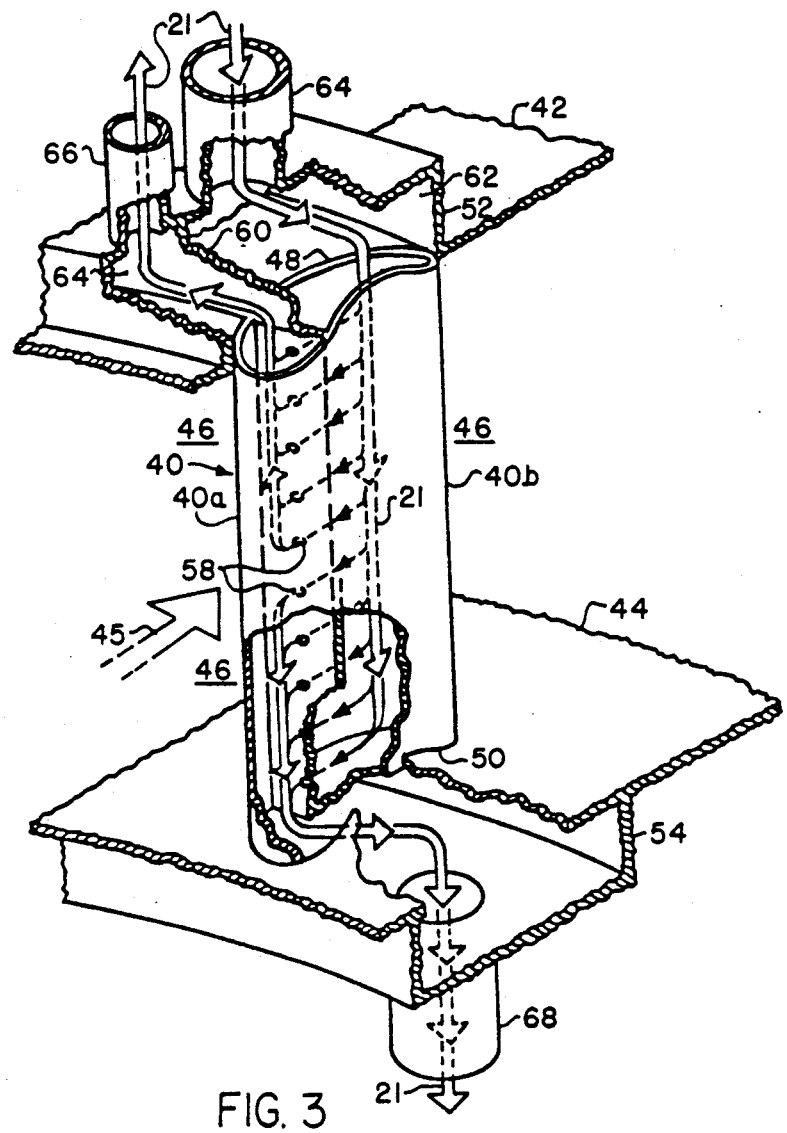
FIG. 3 is a schematic of a second embodiment of the invention.
Figure 4:
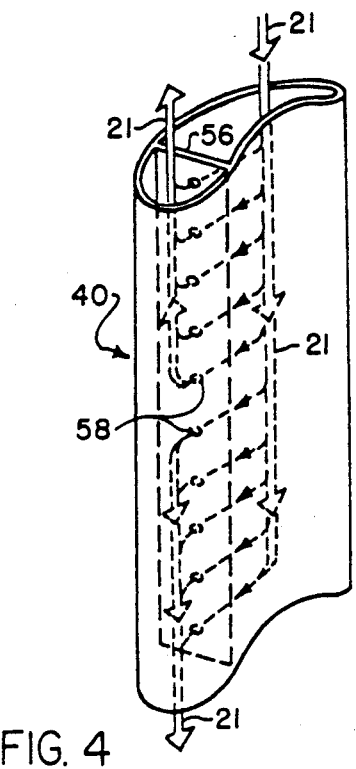
FIG. 4 is a schematic of the guide vane used in the embodiment of FIG. 3.

The embodiment of FIGS. 3 and 4 operates on the same principles as that of the embodiment of FIGS. 1 and 2, but the mechanical arrangement differs in that the vane is divided by a radial, rather than a circumferential wall. In this embodiment of the invention a plurality of hollow inlet guide vanes 40 (only one of which is shown) is mounted in an annulus comprised of an outer cylindrical casing 42 and an inner cylindrical casing 44. Inlet air 45 to the gas turbine engine travels axially past the leading edge 40a of the vanes 40 through the annular space 46 between the casings 42 and 44 into the compressor (not shown). The outer casing 42 is provided with a slot 48 at the outer tip of each of the guide vanes 40 while the inner casing 44 is provided with a slot 50 at the inner tip of each guide vane. A manifold 52 surrounds the outer casing 42, while a manifold 54 surrounds the inner casing 44.

As best seen in FIG. 4, the vane 40 is divided with a thin radial wall 56 provided with a plurality of tuned orifices 58. The manifold 52 is circumferentially divided by a wall 60 to provide two air conduits, conduit 62 to conduct inlet bleed air 21 from inlet pipe 64 into the volume of the vane adjacent the trailing edge 40b, and a second conduit 64 adjacent the trailing edge 40a, to conduct the bleed air 21 which passes through the orifices 58 into outlet pipe 66. Manifold 54 and pipe 68 surrounding the inner casing 44 provide a second conduit for the bleed air passing through the orifices 58.

IN SUMMARY

The novel feature of this invention is to combine convective/impingement heating schemes with acoustical excitation of the inlet guide vanes. A continuous vibration mode of a hollow guide vane is accomplished by utilizing tuned sonic orifices. The continuous vibration mode alone or in combination with heating at lower temperatures can prevent ice build-up at engine power settings above idle.

Because this anti-icing and deicing scheme relies only partially on internal heating, cooler compressor bleed air could be successfully used in many applications. Cooler temperature bleed would allow use of lower temperature capability materials, even at intermediate power. A requirement for an automatic anti-ice shut-off valve would also be eliminated. The use of cooler air from a mid-stage compressor bleed (as compared with compressor discharge) for anti-icing is less of a performance debit, due to reduced heating of the engine flow.

Because this invention relies heavily on acoustical excitation of the intake guide vane, the tuning of the vanes vibrational characteristics can be held constant over the full range of engine power settings. The most difficult areas to anti-ice (leading edges) can be specifically tuned for all possible flight points, icing conditions, and power settings.

It will be understood that the disclosed embodiments are exemplary, and that this invention is subject to various modifications and adaptations without departing from the spirit of the invention. It is intended therefore that this invention be limited only by the following claims as read in the light of the prior art.

What is claimed is:

1. In a system for deicing a selected surface of an inlet guide vane of a gas turbine engine, the combination comprising:

a hollow guide vane having at least one air inlet and one air outlet;

a thin wall in said vane separating said inlet from said outlet, said wall having a plurality of orifices, said orifices being tuned to a selected frequency, said frequency being selected to set up vibrations in said vane; and means for supplying gas under pressure to said inlet, said gas passing through said tuned orifices to establish vibrations in said vane at said selected frequency.

2. The invention as defined in claim 1 wherein the gas passing through said orifices impinges on said selected surface.

3. In a gas turbine engine having an annular air inlet, and hollow inlet guide vanes radially disposed within said annular air inlet, each of said inlet guide vanes having a leading edge and a trailing edge and a radial air inlet and a radial air outlet, the improvement comprising:

a thin wall fixed in said vane and separating said inlet and said outlet;

a plurality of orifices in said thin wall, said orifices being tuned to a selected frequency, said frequency being selected to set up vibrations in said vane; and means for flowing heated gas through said orifices to impinge on selected areas of said inlet guide vane, whereby said areas are heated by said gas, and whereby the gas flowing through said tuned orifices cause the vibration of said inlet guide vanes at said selected frequency.

4. The invention as defined in claim 3 wherein said radial air inlet is adjacent the trailing edge of said vane, and wherein said radial air outlet is adjacent the leading edge of said vane, and wherein said wall is radially disposed between said inlet and said outlet.

5. The invention as defined in claim 3 wherein said inlet is at the the radial outer end of said vane, and the outlet is at the other radial end of said vane, and said wall is positioned across said inlet.

* * * * *